2,980,630
CATALYST RECOVERY

Melvin C. Baker, Niagara Falls, Thomas C. Bissot, Grand Island, and Jack Rowbottom, Niagara Falls, N.Y., assignors to E. I. du Pont de Nemours and Company, Wilmington, Del., a corporation of Delaware No Drawing. Filed Apr. 29, 1958, Ser. No. 731,641

10 Claims. (Cl. 252—414)

This invention relates to the recovery of the active components from a homogeneous catalyst mixture for the synthesis of acrylonitrile by the reaction of hydrogen cyanide and acetylene after said mixture has lost the requisite degree of effectiveness.

The mixture of cuprous chloride dissolved in a nitrile solvent, in particular benzonitrile, and preferably also containing a minor amount of an organic promoter such as dimethylformamide, is a very effective catalytic medium for the reaction between hydrogen cyanide and acetylene to produce acrylonitrile. However, the reaction is accompanied by the formation of undesirable by-products, some of which are tarry substantially non-volatile materials which dilute the catalytic system and thereby decrease the productivity per unit volume of catalyst mixture until a point is reached at which further operation is no longer advantageous. It is accordingly necessary to replace the catalyst with fresh material not overly diluted with tarry non-volatile by-products. This can be done by either replacing the entire catalyst charge or by withdrawal of a portion of the catalyst periodically or continuously and replenishing with equivalent amounts of fresh or active catalyst mixture.

Since the catalyst mixture consisting of cuprous chloride and organic solvents and promoters is fairly expensive, and furthermore creates a troublesome disposal problem it becomes necessary to recover the active values from discarded catalyst and this is accordingly the major objective of the present invention.

This and other objects of our invention can be accomplished by treating the used catalyst mixture containing excessive amounts of non-volatile by-products from the synthesis of acrylonitrile with a water miscible volatile solvent to effect a major separation of cuprous chloride and by-products from the catalyst solvents and promoters. Thereafter the separation residue comprising the major portions of the cuprous chloride and the by-products is treated with aqueous ammonia to dissolve the cuprous chloride to remove it from the insoluble by-products. The ammonia extract containing the cuprous chloride is then distilled to dryness and all the ammonia removed whereupon the residual cuprous chloride can be used to reconstitute active catalyst mixture by the addition thereto of make-up catalyst solvent and promoter or by the addition thereto of catalyst solvent recovered from the water-miscible solvent extract from the used catalyst after separation of the water-miscible solvent therefrom preferably by distillation.

Our invention is further clarified by a review of the following examples which illustrate specific methods of recovering the values from used catalyst mixtures containing excessive amounts of by-product tars.

Example 1

To a closed 2-liter pressure kettle there was added 1000 g. of methanol. The kettle was equipped with an emulsifier of the "Willems" polytron type (a wet milling device for imparting high shear to the mixture) as well as with a sintered glass filter stick to permit the removal of filtered liquid from the kettle. Inlets were also provided for flushing the system with nitrogen and for making liquid additions to the interior of the kettle. After the addition of the methanol the system was flushed with purified nitrogen and then used or "spent" catalyst heated to 100° C. was added dropwise during a time period of about 30 minutes to the agitated methanol which was at about 25° C. The "spent" or used catalyst consisted of 33.7% CuCl 41.6% combined benzonitrile and dimethylformamide and 24.7% by-product tars. The addition of the used catalyst was continued until the liquid methanol system nearly gelled at a final temperature of 26.5° C. Further additions of catalyst would cause gellation. The added used catalyst amounted to 371 g. and consisted of 125 g. CuCl 154 g. volatiles (benzonitrile and dimethylformamide) and 92 g. by-product tars. The precipitate formed in the methanol was allowed to settle and methanol solution removed through the sintered glass filter stick by applying vacuum. The precipitate in the kettle was washed twice with 500 g. portions of methanol and the solutions filtered off each time.

The methanol solution or extract combined with the washings contained most of the volatiles present in the used catalyst. On distilling this solution to remove all the methanol there was obtained a residual liquid weighing 161 g. and consisting of 83.5% volatiles (largely benzonitrile and dimethylformamide) 11.8% cuprous chloride and 4.7% by-product tars. The recovery of volatiles (benzonitrile and dimethylformamide) was 87.3% of that originally present in the used catalyst.

The precipitate remaining after removal of the methanol solution consisted of the larger portions of the by-product tars and of the cuprous chloride. It was treated with 350 g. water, 180 g. aqueous ammonia (28% NH$_3$) and 75 g. of a filter aid (Johns Mansville "Hy-flo Supercel" which is a highly purified diatomaceous silica). This mixture was stirred with careful avoidance of contact with air or oxygen and then the supernatant solution was filtered through a coarse sintered glass funnel. The precipitate was further washed with 800 g. of water. The ammonia extract together with the water wash contained 72.7 g. cuprous chloride. The total cuprous chloride recovery was 73% of that originally present in the used catalyst and could be used again to prepare catalyst for the acrylonitrile synthesis reaction.

Example 2

To the pressure kettle described in Example 1 there was added 1000 g. methanol and the system flushed with purified nitrogen to prevent oxidation of the contents. "Spent" or used catalyst from an acrylonitrile process was heated to 100° C. and added drop-wise over a period of about 30 minutes to the methanol which was rapidly agitated. The used catalyst added amounted to 385 g. and had exactly the same composition as that subjected to the recovery procedure in Example 1, and accordingly contained 130 g. CuCl, 160 g. volatiles (benzonitrile and dimethylformamide) and 95 g. by-product tars. The final temperature of the methanol-used catalyst mixture in the kettle was 35° C. and there was no gel formation. The methanol now contained most of the benzonitrile and dimethylformamide in solution and most of the cuprous chloride and by-product tars were present as a suspension, from which the solution was removed through the glass filter stick using vacuum. The precipitate remaining in the kettle was then slurried twice with 500 g. portions of methanol and each removed by filtration. The combined methanol filtrate was distilled at a maximum temperature of 190° C. and the residue of 161 grams contained 82% benzonitrile and dimethylformamide as well as 10.6% cuprous chloride and 7.4% by-product tars. The suspension remaining after the methanol extraction comprising mainly cuprous chloride and by-product tars was treated with 500 g. of water, 50 g. of filter aid and 200 g. of aqueous ammonia containing 28% by weight $NH_3$. The mixture was filtered through a coarse sintered glass funnel filter and the filter residue washed twice with 500 g. water each time. The residue consisted principally of by-product tars and the aqueous ammonia filtrate and washings primarily of the water soluble ammonia complex of cuprous chloride. The tars and filter aid residue after drying at 125° C. weighed 141 g. and contained 18.4% CuCl and 65 g. tars. Thus there was a separation of 68.5% of the tars originally present in the used catalyst. The ammoniacal filtrate contained 87.7 g. cuprous chloride. The cuprous chloride was recoverable by drying and removal of ammonia from the cuprous chloride-ammonia complex and could then be combined with the distillation residue of the methanol extract to form reconstituted catalyst mixture suitable for the efficient production of acrylonitrile by the reaction of HCN with $C_2H_2$.

In general it is necessary to recover the values from used catalyst when by-product tars in it have accumulated to the extent of over about 18% by weight of the catalyst mixture. A mixture containing over about 30% by weight is commercially no longer useful and must be removed from the synthesis unit and either discarded or subjected to a recovery operation.

Although methanol is a suitable solvent for separating the organic catalyst solvent and the promoter from the cuprous chloride and by-product tars from used acrylonitrile synthesis process catalyst other solvents may also be used such as acetone and monoalcohols such as ethanol and the propanols. In any case the solvent must be miscible with water and must not boil at ordinary pressures at temperatures above about 140° C. Another qualification of a suitable separation solvent is that it should not dissolve more than between about 5 to 35% of the by-product tars originally present in the used catalyst.

The used catalyst mixture is subject to ready oxidation and must therefore be protected from excessive contact with atmospheric oxygen. This is best effected by purging the system with nitrogen containing no oxygen or at least only very small amounts and by conducting all the separating operations under conditions which will prevent excessive contact with oxygen or any other oxidizing materials.

Although the examples detailed above relate to the separation of by-product tars from an acrylonitrile synthesis catalyst comprising cuprous chloride, benzonitrile and dimethylformamide the invention is not limited to this particular solvent and promoter. In fact, a system containing only benzonitrile and cuprous chloride may be separated from excessive by-product tars accumulated therein. Further, any organic nitrile boiling above 100° C. and being a good solvent for cuprous chloride may be used provided only that said nitrile be liquid at the synthesis temperature between about 80 to 140° C. As to the promoter, while dimethylformamide is preferred other organic promoters may be present in the synthesis catalyst such as straight chain and cyclic amides and their N-substituted derivatives provided they boil above 100° C. at ordinary pressures and are liquid at temperatures between about 80° and 140° C.

The preferred procedure is to add the heated used catalyst gradually to the methanol or equivalent solvent while stirring the solvent to avoid the formation of a gel in the system. It is also preferable to have the solvent at at least ambient temperature but of course not a temperature above the boiling temperature of the solvent. The used catalyst should be molten and for many mixtures a temperature between about 50° and 120° C. is adequate. The duct leading into the vessel containing the solvent should be adapted to prevent cooling the used catalyst to below about 40° C. or below its solidifying point before it enters the solvent for extraction.

Any suitable filtration method may be used to separate the extracting solvent from the cuprous chloride and the by-product tars provided excessive contact with air is avoided. It is advisable to add a suitable filter aid to the solution of cuprous chloride in aqueous ammonia to effect easy separation of the insoluble by-product tars therefrom by filtration. Such agents are well known to the art and need not be enumerated here.

Some of the cuprous chloride will dissolve in the extraction solvent because it will generally not be advisable to use sufficiently excessive amounts of such solvents as methanol completely to suppress the high solution power of benzonitrile for the cuprous chloride. Likewise, it will be difficult to prevent part of the by-product tars from passing into the extraction solvent as well as into the aqueous ammonia solution of the cuprous chloride. However, such amounts are relatively small and are permissible since they do not prevent the reconstituting of a good catalyst from the recovered catalyst mixture components.

What we claim is:

1. The process for separating cuprous chloride and organic solvents from used non-aqueous acrylonitrile catalyst solution of cuprous chloride dissolved in organic nitrile solvent therefor which boils above 100° C. and is a liquid between 80° and 140° C. and non-volatile by-products after use in the production of acrylonitrile from hydrogen cyanide and acetylene which comprises, while protecting the cuprous chloride from oxidation, precipitating the cuprous chloride and by-products from said non-aqueous catalyst solution with a water-miscible volatile solvent for the organic nitrile which solvent is a monoalcohol boiling below about 140° C. under normal pressure by gradually mixing the catalyst solution, maintained in a molten condition at 50°–120° C., with the water-miscible solvent, maintained between ambient temperature and the boiling point, while stirring to avoid gelling; separating the solvent mixture from the precipitated cuprous chloride and by-products; dissolving the cuprous chloride in aqueous ammonia, leaving a residue of undissolved by-products; and separating the cuprous solution from the insoluble by-products.

2. The process of claim 1 wherein the water-miscible solvent is methanol.

3. The process of claim 1 wherein the organic solvent is benzonitrile.

4. The process of claim 1 wherein the organic solvent is benzonitrile and the water-miscible solvent is methanol.

5. The process as defined in claim 1 wherein said non-aqueous catalyst solution comprises cuprous chloride dissolved in organic nitrile solvent therefor which boils above 100° C. and is a liquid between 80° and 140° C., a straight chain amide promoter which boils above 100° C. at ordinary pressures and is liquid at temperatures between about 80° and 140° C., and in excess of about 18% by weight of non-volatile by-products; and the solvent mixture separated from the precipitated cuprous chloride and by-products contains in solution major portions of said organic nitrile and said promoter.

6. The process of claim 5 wherein the water-miscible solvent is methanol.

7. The process of claim 5 wherein the organic solvent is benzonitrile.

8. The process of claim 5 wherein the promoter is dimethylformamide.

9. The process of claim 5 wherein the organic solvent is benzonitrile and the promoter is dimethylformamide.

10. The process of claim 5 wherein the organic solvent is benzonitrile, the promoter is dimethylformamide and the water-miscible solvent is methanol.

References Cited in the file of this patent

UNITED STATES PATENTS

| | | |
|---|---|---|
| 2,649,418 | Stehman | Aug. 18, 1953 |
| 2,748,157 | Taylor | May 29, 1956 |
| 2,763,676 | Porret | Sept. 18, 1956 |
| 2,798,882 | Christopher et al. | July 9, 1957 |